United States Patent [19]
Rixon et al.

[11] Patent Number: 5,819,593
[45] Date of Patent: *Oct. 13, 1998

[54] ELECTRONIC ADJUSTABLE PEDAL ASSEMBLY

[75] Inventors: Christopher J. Rixon, Tecumseh, Canada; Christopher Bortolon, Clawson, Mich.

[73] Assignee: Comcorp Technologies, Inc., Warren, Mich.

[ * ] Notice: The term of this patent shall not extend beyond the expiration date of Pat. No. 5,632,183.

[21] Appl. No.: 516,050

[22] Filed: Aug. 17, 1995

Related U.S. Application Data

[63] Continuation-in-part of Ser. No. 513,017, Aug. 9, 1995, Pat. No. 5,632,183.

[51] Int. Cl.$^6$ .................................................. G05G 1/14
[52] U.S. Cl. .................................................. 74/514; 74/513
[58] Field of Search ............................ 74/514, 513, 512, 74/560

[56] References Cited

U.S. PATENT DOCUMENTS

| | | | |
|---|---|---|---|
| 3,643,524 | 2/1972 | Herring | 74/513 X |
| 3,643,525 | 2/1972 | Gibas | 74/513 X |
| 4,582,653 | 4/1986 | Blanchard et al. | 261/65 |
| 4,640,248 | 2/1987 | Stoltman | 423/399 |
| 4,869,220 | 9/1989 | Imoehl | 123/399 |
| 4,875,385 | 10/1989 | Sitrin | 74/512 |
| 4,905,544 | 3/1990 | Ganoung | 74/858 |
| 4,912,997 | 4/1990 | Malcolm et al. | 74/335 |
| 4,915,075 | 4/1990 | Brown | 123/399 |
| 4,944,269 | 7/1990 | Imoehl | 123/399 |
| 4,958,607 | 9/1990 | Lundberg | 123/399 |
| 4,976,166 | 12/1990 | Davis et al. | 74/512 |
| 4,989,474 | 2/1991 | Cicotte et al. | 74/512 |
| 5,045,035 | 9/1991 | Ganoung | 475/42 |
| 5,078,024 | 1/1992 | Cicotte et al. | 74/512 |
| 5,233,882 | 8/1993 | Byram et al. | 74/514 |
| 5,241,936 | 9/1993 | Byler et al. | 74/513 X |
| 5,335,563 | 8/1994 | Yamamoto et al. | 74/512 |
| 5,408,899 | 4/1995 | Stewart | 74/513 |
| 5,460,061 | 10/1995 | Redding et al. | 74/513 X |

FOREIGN PATENT DOCUMENTS

| | | | |
|---|---|---|---|
| 67315 | 3/1991 | Japan | 74/512 |
| 4128519 | 4/1992 | Japan . | |

*Primary Examiner*—Charles A. Marmor
*Assistant Examiner*—MaryAnn Battista
*Attorney, Agent, or Firm*—Howard & Howard

[57] ABSTRACT

An electronic adjustable control pedal assembly for a motor vehicle including a carrier, a guide rod adapted to be secured to the dash panel of the vehicle and mounting the carrier for fore and aft movement along the guide rod, a power drive operative to move the carrier along the guide rod, and a pedal structure including a pedal arm pivotally mounted on the carrier and a potentiometer mounted on the carrier and operative to generate an output electrical signal proportioned to the extent of pivotal movement of the pedal arm.

4 Claims, 4 Drawing Sheets

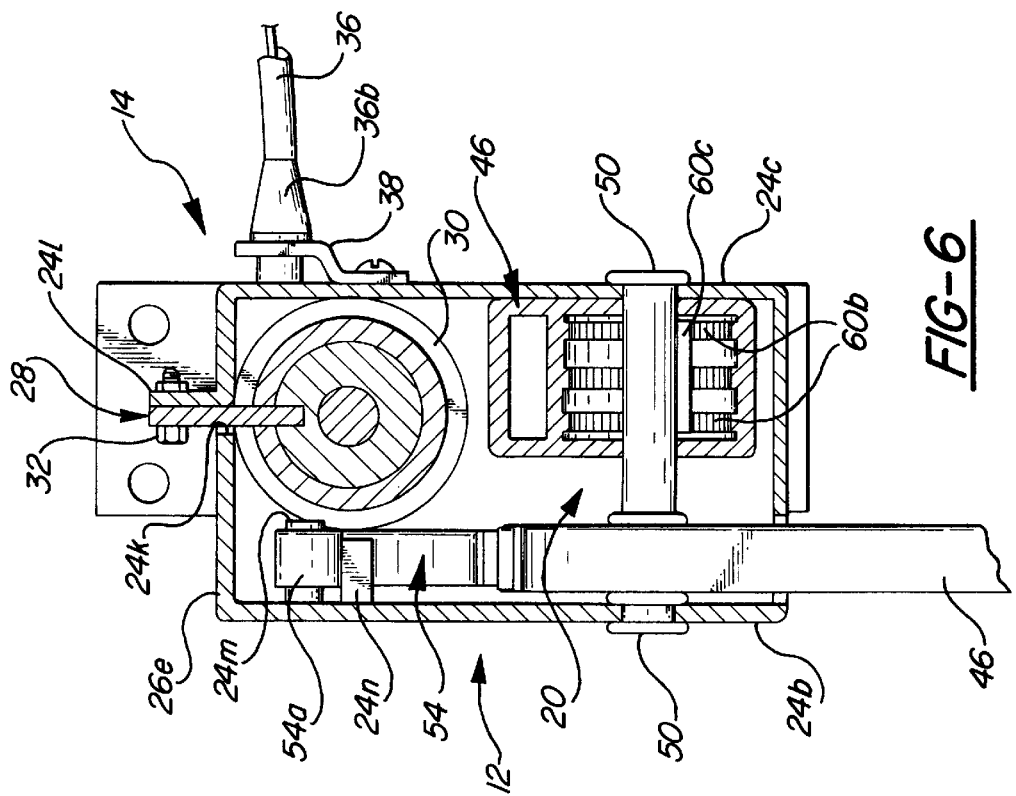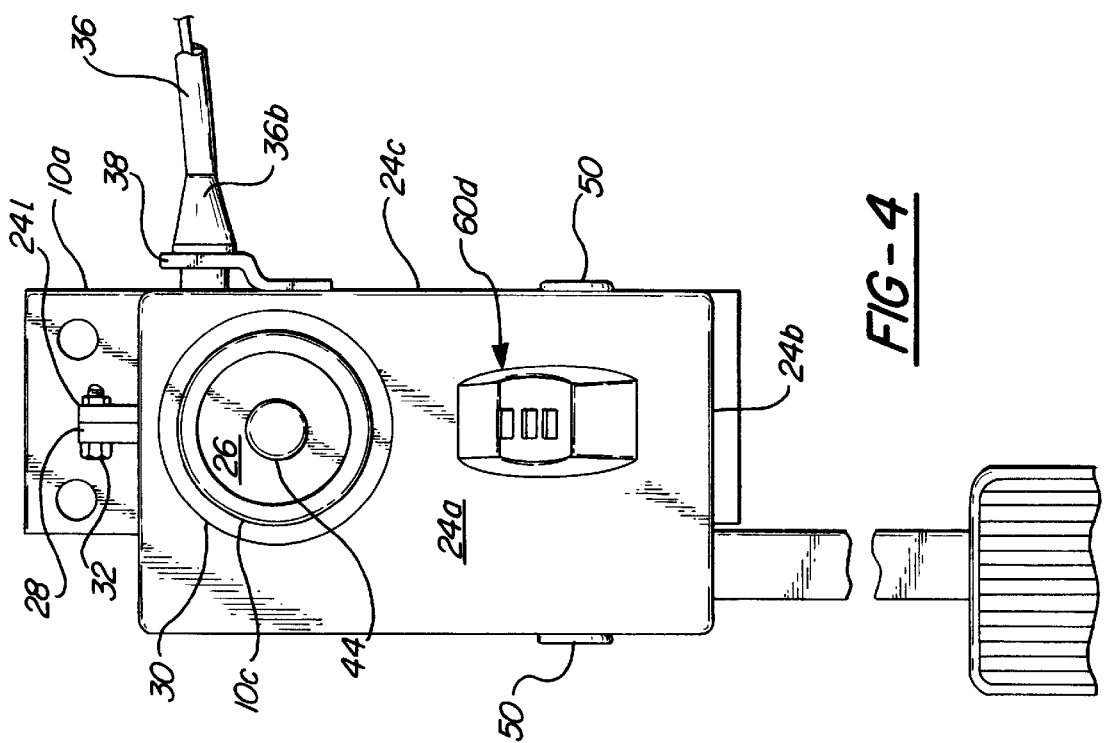

ELECTRONIC ADJUSTABLE PEDAL ASSEMBLY

RELATED APPLICATION

This application is a continuation-in-part of U.S. patent application Ser. No. 08/513,017 filed on Aug. 9, 1995, now U.S. Pat. No. 5,632,183, and entitled Adjustable Pedal Assembly.

BACKGROUND OF THE INVENTION

This invention relates to control pedal apparatuses and more particularly to adjustment means for selectively adjusting the position of one or more of the control pedals of a motor vehicle.

In a conventional automotive vehicle pedals are provided for controlling brakes and engine throttle. If the vehicle has a manual transmission a clutch pedal is also provided. These pedals are foot operated by the driver. In order for the driver to maintain the most advantageous position for working these control pedals the vehicle front seat is usually slidably mounted on a seat track with means for securing the seat along the track in a plurality of adjustment positions.

The adjustment provided by moving the seat along the seat track does not accommodate all vehicle operators due to differences in anatomical dimensions. Further, there is growing concern that the use of seat tracks, and especially long seat tracks, constitutes a safety hazard in that the seat may pull loose from the track during an accident with resultant injuries to the driver and/or passengers. Further, the use of seat tracks to adjust the seat position has the effect of positioning shorter operators extremely close to the steering wheel where they are susceptible in an accident to injury from the steering wheel or from an exploding air bag. It is therefore desirable to either eliminate the seat track entirely or shorten the seat track to an extent that it will be strong enough to retain the seat during an impact. Shortening or eliminating the seat track requires that means be provided to selectively move the various control pedals to accommodate various size drivers.

Various proposals were made over a period of many years to provide selective adjustment of the pedal positions to accommodate various size drivers but none of these proposals met with any significant commercial acceptance since the proposed mechanisms were unduly complex and expensive and/or were extremely difficult to operate and/or accomplished the required pedal adjustment only at the expense of altering other critical dimensional relationships as between the driver and the various pedals. Recently a control pedal mechanism has been developed which is simple and inexpensive and easy to operate and that accomplishes the required pedal adjustment without altering further critical dimensional relationships as between the driver and the various pedals. This control pedal mechanism is disclosed in U.S. Pat. Nos. 4,875,385; 4,989,474 and 5,078,024 all assigned to the assignee of the present application. The present invention represents further improvements in adjustable control pedal design and specifically relates to an adjustable control pedal apparatus which is compatible with, and incorporates, a drive-by-wire arrangement in which the link between the pedal and the associated controlled device of the motor vehicle comprises an electronic signal rather than a mechanical linkage.

SUMMARY OF THE INVENTION

This invention is directed to the provision of a simple, inexpensive and effective apparatus for adjusting the control pedals of a motor vehicle.

More specifically, this invention is directed to the provision of an adjustable control pedal apparatus that is especially suitable for use in conjunction with a drive-by-wire throttle control.

The invention apparatus is adapted to be mounted on the body structure of the motor vehicle and includes a carrier, guide means mounting the carrier for fore and aft movement relative to the body structure, and drive means operative to move the carrier along the guide means. According to the invention, the pedal assembly further includes a pedal structure mounted on the carrier for movement relative to the carrier and means operative in response to movement of the pedal structure on the carrier to generate an electrical signal proportioned to the extent of movement of the pedal structure on the carrier. This arrangement provides a simple and effective means of generating an electronic control signal on an adjustable pedal assembly and ensures that the ergonomics of the control pedal will not vary irrespective of the position of adjustment of the pedal structure.

According to a further feature of the invention, the pedal structure is pivotally mounted on the carrier and the electric signal is generated in response to pivotal movement of the pedal structure on the carrier. This specific arrangement retains the customary pivotal movement of the control pedal and also maintains the constant ergometric operation of the control pedal assembly.

According to a further feature of the invention, the generator means includes a potentiometer mounted on the carrier whose setting is varied in response to pivotal movement of the pedal structure on the carrier. This specific arrangement provides a simple and effective means of generating the required electronic signal to provide drive-by-wire operation.

According to a further feature of the invention, the pedal structure includes a pedal arm and a pedal mounted on a lower end of the pedal arm; the pedal assembly further includes a feedback apparatus; and the feedback apparatus includes a spring mounted on the carrier and arranged to exert a spring force against the pedal arm that varies in response to pivotal movement of the pedal arm, a first friction surface defined on the pedal arm, and a second friction surface defined on the spring and arranged for wiping coaction with the first friction surface in response to pivotal movement of the pedal arm. This specific arrangement provides a simple and effective means of providing the desired feel or feedback to the operator upon movement of the pedal and further provides the desired hysteresis effect.

According to a further feature of the invention the first friction surface is defined by a cam surface on the pedal arm; the spring comprises a leaf spring fixedly secured at one end thereof to the carrier and defining a free end; and the second friction surface is defined on the free end of the leaf spring. With this arrangement, pivotal movement of the pedal arm generates wiping action between the cam surface and the free end of the spring and varies the extent of flexing of the spring about its fixed end.

According to a further feature of the invention, the feedback apparatus means further includes a first resistance plate mounted on the upper region of the pedal arm and a second resistance plate mounted on the free end of the leaf spring and biased against the first resistance plate. This arrangement allows the resistance offered to the pivoting pedal to be varied either by varying the spring characteristics of the spring or by varying the resistance characteristics of the resistance plates.

BRIEF DESCRIPTION OF THE DRAWING

FIG. 4 is an end view of the pedal assembly;

FIG. 6 is a cross-sectional view taken on line 6—6 of FIG. 5.

DETAILED DESCRIPTION OF THE PREFERRED EMBODIMENT

Figure 1:
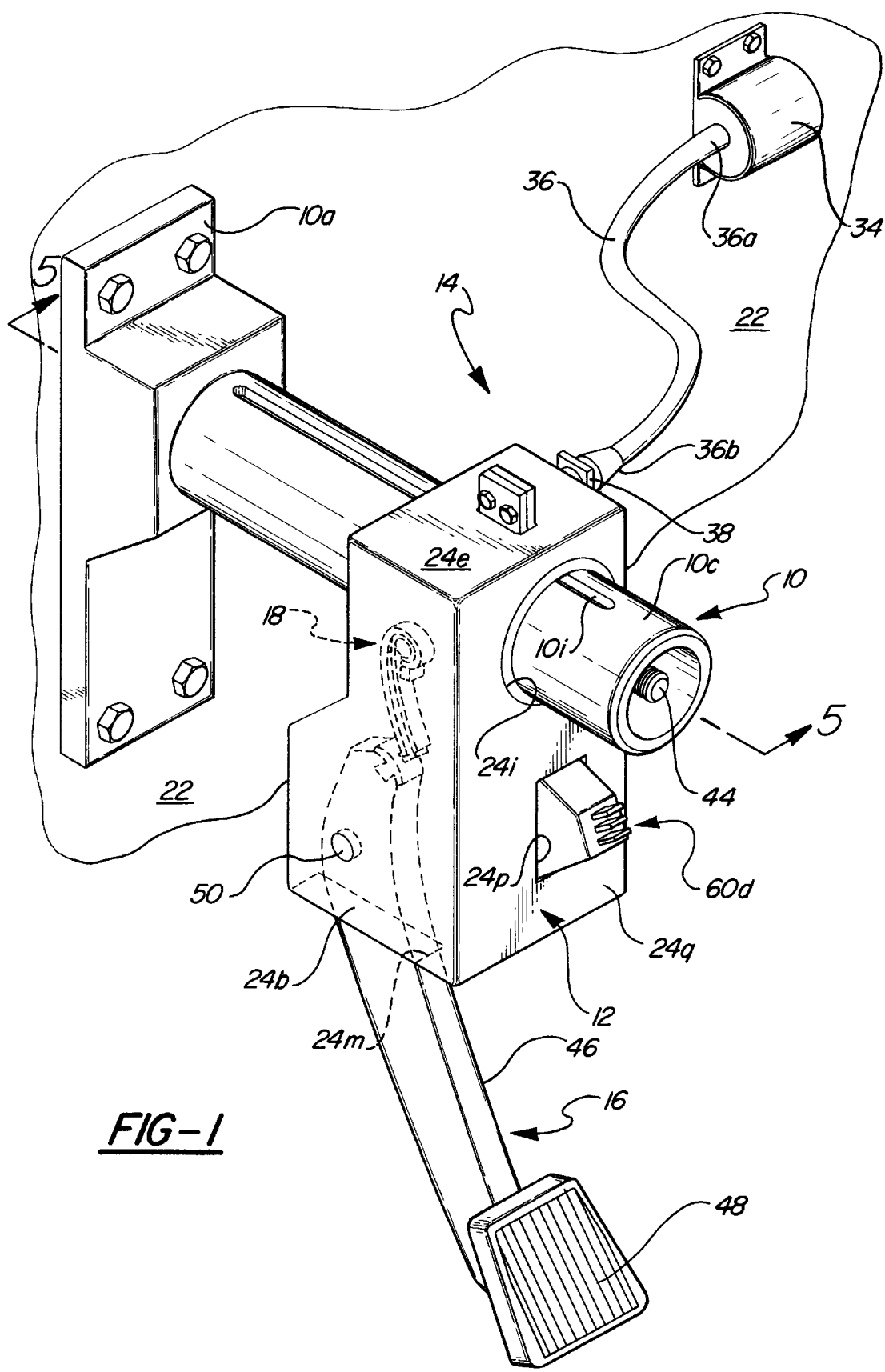
FIG. 1 is a perspective view of an electronic adjustable pedal assembly according to the invention.
Figure 2:
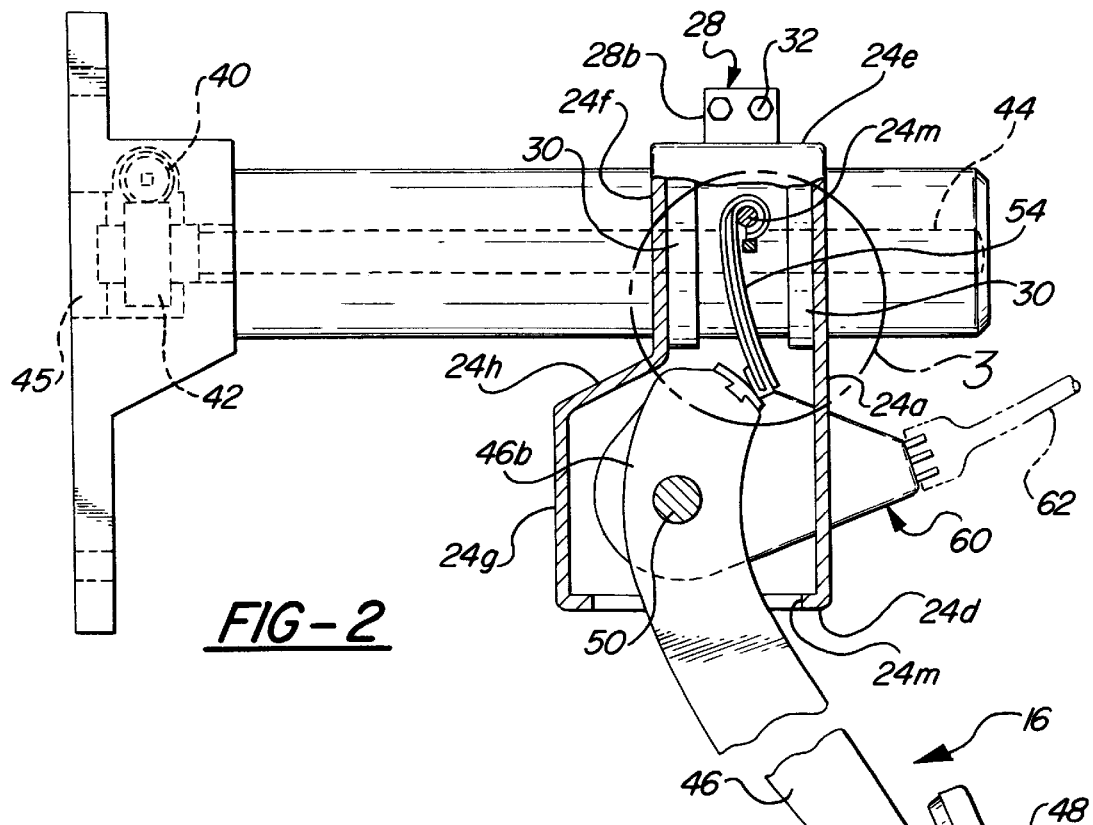
FIG. 2 is a fragmentary side view of the pedal assembly.
Figure 3:
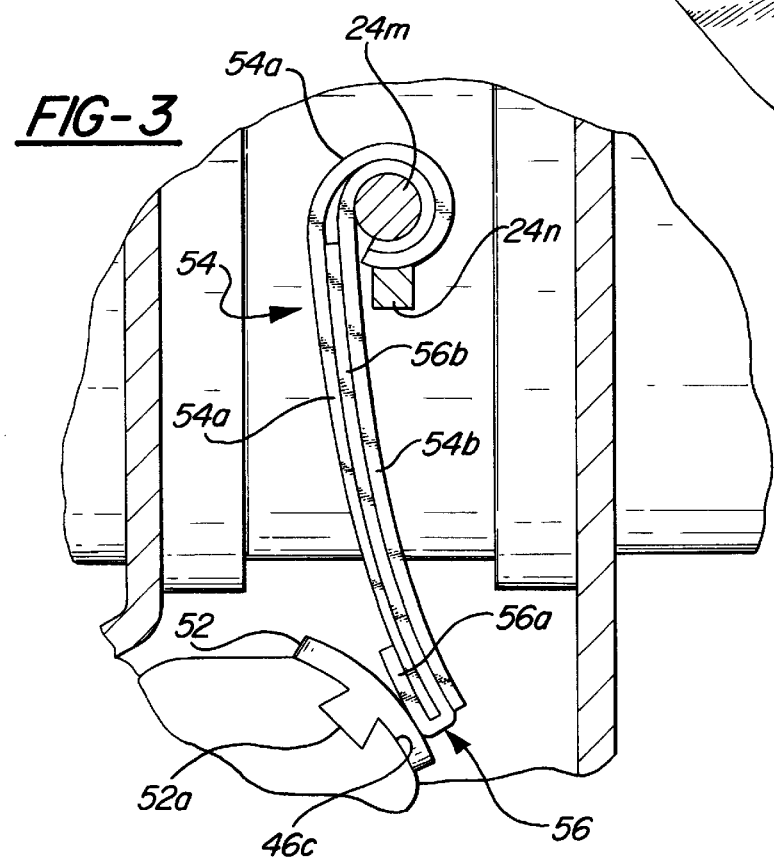
FIG. 3 is a detail view taken within the closed line 3 of FIG. 2.
Figure 5:
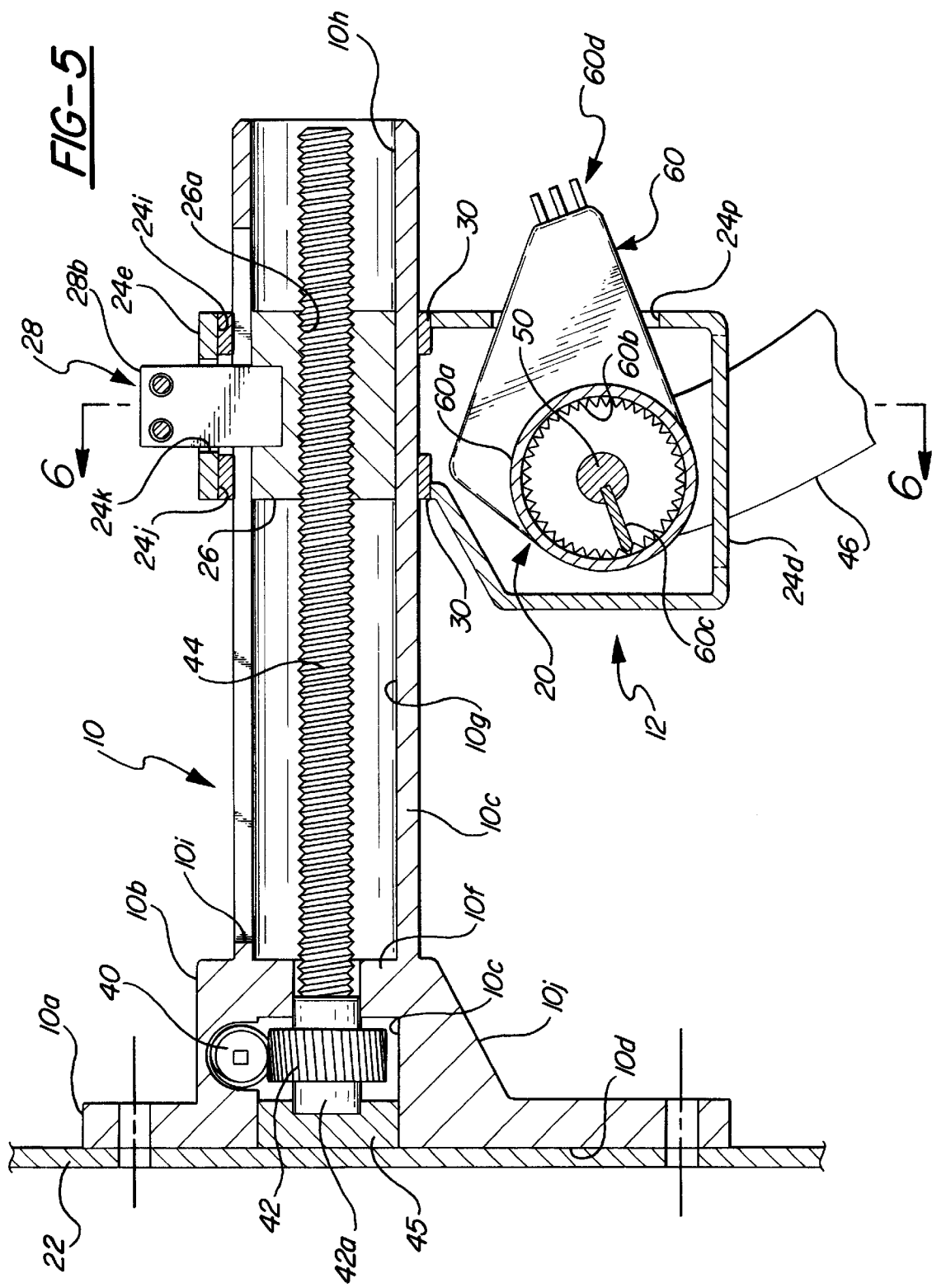
FIG. 5 is a cross-sectional view taken on line 5—5 of FIG. 1.

The invention control pedal assembly, broadly considered, is intended to allow efficient fore and aft movement of the pedal assembly to accommodate operators of varying anatomical dimension and is operative to generate an electronic or drive-by-wire signal in response to pivotal movement of the pedal assembly while retaining the same ergometric operation of the pedal irrespective of the position of adjustment of the pedal.

The pedal assembly includes a support structure 10, a carrier assembly 12, a drive assembly 14, a pedal assembly 16, a resistance or feedback assembly 18, and a generator means 20.

Support structure 10 may be formed as two or more parts which are suitably joined together or may, as shown, be formed as a single integral unitary member in a casting or forging operation. Structure 10 includes a bracket portion 10a, a transmission housing portion 10b, and a guide rod portion 10c.

Bracket portion 10a is adapted to be suitably secured to the dash panel 22 of the associated motor vehicle utilizing suitable fastener means in known manner.

Transmission housing portion 10b extends rearwardly from bracket portion 10a and has a generally cubicle configuration defining a hollow 10c opening at the front face 10d of bracket 10a and further defining a central bore 10e in a rear wall 10f of the housing portion.

Guide rod portion 10c extends rigidly rearwardly from the rear wall 10f of the transmission housing portion, is hollow so as to provide a tubular configuration defining a central circular bore 10g concentric with bore 10e, is open at its rear end 10h, and includes an upper axial slot 10i extending from a location proximate the transmission housing wall 10f to a location proximate guide rod rear end 10h.

Carrier assembly 12 includes a housing 24, a nut 26, and a key 28.

Housing 24 may be formed as a casting, forging or stamping, and is designed to move slidably along the guide rod portion 10c of support structure 10. Housing 24 includes a rear wall 24a, side walls 24b and 24c, a bottom wall 24d, a top wall 24e, and a front wall including an upper portion 24f, a lower portion 24g, and an angled intermediate connector portion 24h. A circular opening 24i is provided in rear wall 24a proximate top wall 24e and a circular opening 24j is provided in front wall upper portion 24f proximate top wall 24e in axial alignment with opening 24i. Housing 24 is mounted on the guide rod portion 10c of support structure 10 with guide rod portion 10c passing through apertures 24i and 24j and bushings 30 positioned in apertures 24i and 24j in sliding engagement with the outer periphery of guide rod portion 10c so as to mount the housing for sliding movement along the guide rod. Angled front wall 24h is complementary to the angled lower surface 10j of the transmission housing portion 10b of support structure 10 so that the housing 24 may move into nesting relation with respect to the support structure with the housing in its extreme forward position.

Nut 26 is circular, is mounted for sliding movement in circular bore 10g of support structure 10, and defines a central threaded bore 26a.

Key 28 is seated at its lower end 28a in a notch 26b in the upper periphery of nut 26 and passes upwardly through slot 10i and through an opening 24k in top housing wall 24e for securement at its upper end 28b, by fasteners 32, to a flange 24l upstanding from housing top wall 24e. Key 28 thus lockingly interconnects nut 26 and housing 24 so that movement of nut 26 in bore 10g is imparted to housing 24 so as to move housing 24 axially along guide rod portion 10c.

Drive assembly 14 includes a motor 34, a cable 36, a bracket 38, a worm 40, a worm gear 42, and a screw shaft 44.

Motor 34 comprises a suitable electric motor, with position memory if required, and is suitably secured to dash panel 22 proximate the bracket portion 10a of the support structure.

Cable 36 comprises a well-known bowden cable and is drivingly secured at one end 36a to the output shaft of motor 34. Bracket 38 is secured to an outer face of transmission housing 10b and mounts the other end 36b of cable 36.

Worm 40 is suitably journalled in transmission housing 10b in overlying relation to cavity 10c and is drivingly connected to cable end 36b.

Worm gear 42 is journalled in cavity 10c in meshing engagement with worm 40 and includes a front trunion 42a journalled in a bearing 45 positioned in the open front end of cavity 10c and a rear trunion 42b journalled in a counterbore 10k in transmission rear wall 10f.

Screw shaft 44 extends rearwardly from worm gear 42 centrally within support structure bore 10g and passes threadably through the threaded central bore 26a of nut 26.

It will be seen that actuation of motor 34 has the effect of rotating screw shaft 44 to thereby move nut 26 and housing 24 fore and aft along guide rod 10c with the extent of forward and rearward movement defined and limited by engagement of key 28 with the front and rear ends of slot 10i.

Pedal assembly 16 includes a pedal arm 46 and a pedal 48 secured to the lower end 46a of the pedal arm. Pedal arm 46 passes upwardly through a slot 24m in the lower housing wall 24d for pivotal mounting at its upper end 46b to housing side walls 24b and 24c via a pivot shaft 50.

Resistance assembly 18 includes a pedal arm friction cam plate 52, a leaf spring 54, and a spring friction cam plate 56. Resistance assembly 18 is intended to provide feedback or "feel" to the operator to replace the feedback normally provided by the mechanical linkage interconnecting the pedal and the controlled device such as the fuel throttle. With a mechanical linkage, the pedal pressure required when advancing the accelerator pedal is greater than that required to maintain a fixed position. This difference is often referred to as due to the hysteresis effect. This effect is important in maintaining the accelerator pedal in position while driving at a relatively constant speed and it must also be considered in achieving a desired deceleration time. The pressure which must be applied in accelerating is easily borne but if the back pressure of an accelerator spring produced the same effect during the time it was required to retain or maintain speed it would soon become uncomfortable for the operator to maintain a relatively constant speed. The hysteresis effect provides relief. It lessens the load required to maintain a setting of the accelerator yet there is still force to cause reverse pedal action when the foot applied pressure is removed. Resistance assembly 18 provides the "feel" of a mechanical linkage including the desired hysteresis effect to relieve operator fatigue.

Pedal arm friction cam plate 52 may be formed, for example, of a plastic material such as Delrin® and is secured to an upper cam edge 46c of the pedal arm via a dovetail connection 52a.

Spring 54 comprises a laminated leaf spring and includes a curl 54a at its upper end wrapped around a pin 24m projecting inwardly from housing side wall 24b. A nub 24n projects inwardly from housing side wall 24b below pin 24m and coacts with pin 24m to trap the end tip 54b of curl 54a to fixedly secure the upper end of the spring to housing side wall 24b.

Spring friction cam plate 56 may be formed, for example, of a glass filled nylon material and includes a working portion 56a suitably secured to the lower end 54b of leaf spring 54 and a tail portion 56b passing upwardly between the leaves 54a, 54b of leaf spring 54. The parts are configured such that with the pedal 48 in its upper or rest position, as seen in FIG. 1, friction plate working portion 56a is urged against friction plate 52 by spring 54 so as to resist pivotal movement of the pedal assembly to an operative position with the resistance being constituted both by the increasing resistance force of the spring 54 and by the frictional resistance force between plates 52 and 56a generated by the wiping or camming action of plate 52 against plate 56a as the pedal arm pivots about the axis of pivot shaft 50. Upon release of pressure on the pedal, the frictional resistance force between plates 52 and 56a become subtractive rather than additive with respect to the force of spring 54, thereby creating the desired hysteresis effect. The materials of cam plates 52 and 56a may be selectively varied to selectively vary the friction levels and hence the damping or hysteresis effect provided by the rubbing plates.

Generator means 20 comprises a potentiometer 60 positioned within the hollow of housing 24 and suitably secured to housing side wall 24c. Potentiometer 60 includes a central shaft, constituted by the pivot shaft 50, a housing 60a concentric with shaft 50, a plurality of resistance elements 60b mounted circumferentially around the inner periphery of housing 60a in side-by-side relation, a wiper arm 60c mounted on shaft 50 and operative to electrically slidably engage the resistance elements 60b in response to pivotal movement of shaft 50, and an outlet 60d projecting rearwardly through opening 24p in housing rear wall 24a and electrically connected to wiper 60c and resistance elements 60b in a manner such that the electrical signal appearing at the outlet 60d varies in proportion to the extent of pivotal movement of the pivot shaft 50. It will be seen that pivotal movement of pedal 48 has the effect of rotating pivot shaft 50 and thereby varying the electrical signal appearing at the potentiometer outlet 60d so that the signal appearing at outlet 60d is at all times proportioned to and indicative of the pivotal position of the pedal. It will be understood that electric power is suitably supplied to potentiometer 60 and an electrical conduit 62 is suitably connected to potentiometer outlet 60d and extends to the vehicle function or accessory, such as the vehicle throttle, that is being electrically controlled by the pedal assembly.

In operation, the position of the pedal 48 relative to the operator is selectively adjusted by selectively energizing motor 34 to selectively move nut 26 forwardly and rearwardly within guide rod bore 10g and thereby, via key 28, move the pedal assembly selectively forwardly and rearwardly along guide rod 10c with the limits of forward and rearward movement determined by engagement of the key with the respective forward and rearward ends of the slot 10i. In any position of adjustment of the pedal, actuation of the pedal or release of the pedal results, in the manner previously described, in the generation of an output signal at the outlet 60d proportioned to the extent of pivotal movement. Since the pivotal movement of the pedal arm is precisely the same in any position of adjustment of the pedal structure, the ergometrics of the assembly do not vary irrespective of the position of adjustment of the pedal assembly and irrespective of the anatomical stature of the operator.

As the pedal is moved downwardly, a "feel" is imparted to the pedal, simulating the feel of a mechanical linkage between the pedal and the controlled vehicle system, by the combined effect of flexing of the leaf spring 54 and frictional sliding or wiping engagement between the friction plates 52 and 56a. Further, as the pedal is released or allowed to return, the frictional force becomes subtractive rather than additive with respect to the spring force, thereby creating the desired hysteresis effect. The amount of feel imparted to the pedal can thus be precisely adjusted by adjusting the spring rate or other parameters of leaf spring 54, and/or by adjusting the materials or other parameters of friction plates 52 and 56a, and/or by adjusting the rise of cam edge 46c, thereby rendering it relatively easy to fine tune the system to achieve any desired feel and any desired hysteresis effect.

The invention will be seen to provide an electronic adjustable pedal assembly for a motor vehicle in which the assembly may be readily adjusted to accommodate operators of varying anatomical dimensions and in which the ergometrics of the system remain constant irrespective of the position of adjustment of the pedal structure.

Whereas a preferred embodiment of the invention has been illustrated and described in detail, it will be apparent that various changes may be made in the disclosed embodiment without departing from the scope or spirit of the invention. For example, although the invention pedal assembly has been indicated for use in controlling the throttle of the associated vehicle, the invention pedal assembly may be used to electrically control a wide variety of vehicle functions or accessories. Further, although the resistance assembly 18 has been illustrated as providing the damping for an adjustable pedal assembly, it will be apparent that this resistance assembly can also be utilized to provide damping for a non-adjustable pedal assembly.

What is claimed is:

1. An adjustable pedal assembly for a motor vehicle adapted to be mounted on a body structure of the vehicle and operative to generate a control signal for controlling an associated device of the motor vehicle, said assembly comprising:

a carrier;

guide means mounting the carrier for fore and aft movement relative to the vehicle body structure;

drive means for moving the carrier along the guide means;

a pedal structure mounted on the carrier for movement relative to the carrier; and generator means operative in response to movement of the pedal structure relative to the carrier to generate an electric control signal proportioned to the extent of movement of the pedal structure relative to the carrier;

the carrier defining a smooth bore and a threaded bore;

the guide means including a guide rod slidably received in the smooth bore; and the drive means including a screw shaft threadably received in the threaded bore.

2. An adjustable pedal assembly for a motor vehicle adapted to be mounted on a body structure of the vehicle and operative to generate a control signal for controlling an associated device of the motor vehicle, said assembly comprising:

a carrier;

guide means mounting the carrier for fore and aft movement relative to the vehicle body structure;

drive means for moving the carrier along the guide means;

a pedal structure including an upper end pivotally mounted on the carrier; and generator means operative in response to pivotal movement of the pedal structure on the carrier to generate an electric control signal proportioned to the extent of pivotal movement of the pedal structure;

the carrier defining a smooth bore and a threaded bore;

the guide means including a guide rod slidably received in the smooth bore; and the drive means including a screw shaft threadably received in the threaded bore.

3. An adjustable pedal assembly for a motor vehicle adapted to be mounted on a body structure of the vehicle and operative to generate a control signal for controlling an associated device of the motor vehicle, said assembly comprising:

a carrier;

guide means mounting the carrier for fore and aft movement relative to the vehicle body structure;

drive means for moving the carrier along the guide means;

a pedal structure including an upper end pivotally mounted on the carrier;

generator means operative in response to pivotal movement of the pedal structure on the carrier to generate an electric control signal proportioned to the extent of pivotal movement of the pedal structure;

resistance means operative to resist pivotal movement of the pedal structure;

the pedal structure including a pedal arm and a pedal mounted on a lower end of the pedal arm;

the resistance means including a leaf spring fixedly mounted at one end thereof on the carrier and having a free end biased against an upper region of the pedal arm;

the resistance means further including a first resistance plate mounted on the upper region of the pedal arm and a second resistance plate mounted on the free end of the leaf spring and biased against the first resistance plate.

4. An adjustable pedal assembly for a motor vehicle adapted to be mounted on a body structure of the vehicle and including a carrier, guide means mounting the carrier for fore and aft movement relative to the body structure, and drive means operative to move the carrier along the guide means, characterized in that:

the pedal assembly further includes a pedal structure mounted on the carrier for movement relative to the carrier and generator means operative in response to movement of the pedal structure on the carrier to generate an electrical signal proportioned to the extent of movement of the pedal structure on the carrier;

the guide means comprises a guide rod;

the carrier includes an upper portion mounted on the guide rod for sliding fore and aft movement along the guide rod;

the pedal structure includes a pedal arm having an upper end mounted on a lower portion of the carrier;

the pedal arm is pivotally mounted on the lower carrier portion;

the generator means includes a potentiometer mounted on the lower portion of the carrier and means operative in response to pivotal movement of the pedal arm to vary the setting of the potentiometer;

the guide rod comprises a hollow rod;

the carrier further includes a nut slidably positioned within the hollow of the guide rod and means connecting the nut to the upper portion of the carrier so that sliding movement of the nut within the guide rod moves the carrier fore and aft along the guide rod;

the drive means includes a screw shaft threadably received in the nut and means operative to rotate the screw shaft.

* * * * *